United States Patent
Kitagawa et al.

(10) Patent No.: US 10,838,548 B2
(45) Date of Patent: Nov. 17, 2020

(54) DISPLAY DEVICE WITH TOUCH PANEL

(71) Applicant: Sharp Kabushiki Kaisha, Sakai (JP)

(72) Inventors: Daiji Kitagawa, Sakai (JP); Jin Miyazawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/435,722

(22) Filed: Jun. 10, 2019

(65) Prior Publication Data

US 2019/0377471 A1 Dec. 12, 2019

Related U.S. Application Data

(60) Provisional application No. 62/683,082, filed on Jun. 11, 2018.

(51) Int. Cl.
*G06F 3/044* (2006.01)
*G06F 3/041* (2006.01)
*G06F 3/047* (2006.01)

(52) U.S. Cl.
CPC .......... *G06F 3/04164* (2019.05); *G06F 3/044* (2013.01); *G06F 3/047* (2013.01)

(58) Field of Classification Search
CPC .. G06F 3/04164; G06F 3/044; G06F 3/04184; G06F 3/047; G06F 3/0412; G06F 3/041661
See application file for complete search history.

(56) References Cited

U.S. PATENT DOCUMENTS

| | | |
|---|---|---|
| 2012/0056835 A1 | 3/2012 | Choo et al. |
| 2017/0192534 A1* | 7/2017 | Han ................. G06F 3/0383 |
| 2017/0228087 A1* | 8/2017 | Liu .................. G06F 3/0412 |
| 2018/0173354 A1* | 6/2018 | Abe ................. G06F 3/0412 |
| 2019/0171329 A1* | 6/2019 | Lv .................. G06F 3/0412 |

FOREIGN PATENT DOCUMENTS

JP 2012-059265 A 3/2012

\* cited by examiner

*Primary Examiner* — Towfiq Elahi
(74) *Attorney, Agent, or Firm* — Keating & Bennett, LLP (57) ABSTRACT

A touch panel display device includes an active matrix substrate and a control unit. The active matrix substrate is provided with gate lines, pixel electrodes connected to the gate lines, counter electrodes disposed to form a matrix, and touch sensor wires connected to the counter electrodes. The control unit alternately switches, during one frame period, between a gate scan period of scanning the gate lines and a sensor scan period of scanning the counter electrodes by a segment SEG and detecting electrostatic capacitance by. The one frame period includes a plurality of gate scan periods and a plurality of sensor scan periods. The control unit scans each of the segments in a first scan mode of completing touch detection of scanning all the segments in the one frame period a number of times other than an integer.

4 Claims, 8 Drawing Sheets

| Scan mode | Scan pattern | Number of sensor scan periods | Frequency (Hz) |
|---|---|---|---|
| Scan mode B | Pattern B1 | 3 | 200 |
| Scan mode B | Pattern B2 | 4 | 150 |
| Scan mode A | Pattern A1 | 5 | 120 |
| Scan mode B | Pattern B3 | 6 | 100 |
| Scan mode B | Pattern B4 | 7 | 86 |
| Scan mode B | Pattern B5 | 8 | 75 |
| Scan mode B | Pattern B6 | 9 | 67 |
| Scan mode A | Pattern A2 | 10 | 60 |
| Scan mode B | Pattern B7 | 11 | 55 |
| Scan mode B | Pattern B8 | 12 | 50 |
| Scan mode B | Pattern B9 | 13 | 46 |
| Scan mode B | Pattern B10 | 14 | 43 |
| Scan mode B | Pattern B11 | 15 | 40 |

| | Pt1 | Pt2 | Pt3 | Pt4 | Pt5 | Pt6 | Pt7 | Pt8 | Pt9 | Pt10 |
|---|---|---|---|---|---|---|---|---|---|---|
| F1 | SEG1-10 | SEG11-20 | SEG21-30 | SEG1-10 | SEG11-20 | SEG21-30 | SEG1-10 | SEG11-20 | SEG21-30 | SEG1-10 |
| F2 | SEG11-20 | SEG21-30 | SEG1-10 | SEG11-20 | SEG21-30 | SEG1-10 | SEG11-20 | SEG21-30 | SEG1-10 | SEG11-20 |
| F3 | SEG21-30 | SEG1-10 | SEG11-20 | SEG21-30 | SEG1-10 | SEG11-20 | SEG21-30 | SEG1-10 | SEG11-20 | SEG21-30 |
| F4 | SEG1-10 | SEG11-20 | SEG21-30 | SEG1-10 | SEG11-20 | SEG21-30 | SEG1-10 | SEG11-20 | SEG21-30 | SEG1-10 |
| F5 | SEG11-20 | SEG21-30 | SEG1-10 | SEG11-20 | SEG21-30 | SEG1-10 | SEG11-20 | SEG21-30 | SEG1-10 | SEG11-20 |
| F6 | SEG21-30 | SEG1-10 | SEG11-20 | SEG21-30 | SEG1-10 | SEG11-20 | SEG21-30 | SEG1-10 | SEG11-20 | SEG21-30 |

FIG. 8

| Scan pattern | Number of sensor scan periods | Number of frames | First frame | Second frame | Third frame | Fourth frame | Fifth frame | Sixth frame | Seventh frame | Eighth frame | Nineth frame |
|---|---|---|---|---|---|---|---|---|---|---|---|
| Pattern B1 | 3 | 3 | | | | ▨ | ▨ | ▨ | ▨ | ▨ | ▨ |
| Pattern B2 | 4 | 2 | | ▨ | ▨ | ▨ | ▨ | ▨ | ▨ | ▨ | ▨ |
| Pattern A1 | 5 | 1 | | | | ▨ | ▨ | ▨ | ▨ | ▨ | ▨ |
| Pattern B3 | 6 | 3 | | | ▨ | ▨ | ▨ | ▨ | ▨ | ▨ | ▨ |
| Pattern B4 | 7 | 7 | | | | | ▨ | ▨ | ▨ | ▨ | ▨ |
| Pattern B5 | 8 | 4 | | | | | | ▨ | ▨ | ▨ | ▨ |
| Pattern B6 | 9 | 9 | | | ▨ | ▨ | ▨ | ▨ | | ▨ | ▨ |
| Pattern A2 | 10 | 1 | | | ▨ | ▨ | ▨ | ▨ | ▨ | ▨ | ▨ |
| Pattern B7 | 11 | 11 | | ▨ | ▨ | ▨ | ▨ | ▨ | ▨ | ▨ | ▨ |
| Pattern B8 | 12 | 6 | ▨ | | ▨ | ▨ | | | ▨ | ▨ | ▨ |
| Pattern B9 | 13 | 13 | | | ▨ | ▨ | ▨ | ▨ | ▨ | ▨ | ▨ |
| Pattern B10 | 14 | 7 | | | ▨ | ▨ | ▨ | | | ▨ | ▨ |
| Pattern B11 | 15 | 3 | | | | ▨ | ▨ | ▨ | ▨ | ▨ | ▨ |

FIG. 9

DISPLAY DEVICE WITH TOUCH PANEL

TECHNICAL FIELD

The invention to be disclosed hereinafter relates to an in-cell touch panel display device.

BACKGROUND ART

Display devices each incorporating a touch panel have been widely used in recent years. Furthermore, there have been particularly recently known so-called in-cell touch panel display devices each incorporating sensing electrodes and wiring for detection of touch operation. JP 2012-59265 A discloses such a display device. The display device according to JP 2012-59265 A includes a thin-film transistor substrate having a pixel array provided therein with a touch sensor array, and is configured to time-divisionally switch, in one frame period, between a display mode of recording data in the pixel array and a touch sensing mode of driving the touch sensor array to sequentially drive the pixel array and the touch sensor array by blocks.

The conventional in-cell touch panel display device is typically configured to end driving the sensing electrodes so as to complete touch detection of acquiring sensor signals from all the sensing electrodes within one frame period. In an exemplary case where touch detection is executed once in one frame period, all the sensing electrodes are scanned only once during the one frame period. In another case where a touch detection motion is executed twice in one frame period, all the sensing electrodes are scanned at double speed in comparison to the case of executing the touch detection motion once, so that all the sensing electrodes are scanned twice in the one frame period. In this manner, the conventional in-cell touch panel display device scans all the sensing electrodes at scan speed in synchronization with an indicated frequency to achieve scanning an integer number of times in one frame period. However, touched position detection may have higher accuracy by scanning at speed different from the above scan speed depending on a situation for execution of touch operation and the type of a medium used for the touch operation.

A touch panel display device disclosed hereinafter is of an in-cell type and is configured to execute touch detection a number of times other than an integer, in one frame period.

SUMMARY OF INVENTION

In order to achieve the object mentioned above, disclosed hereinafter is a touch panel display device having an active matrix substrate, the active matrix substrate including a plurality of gate lines, a plurality of pixel electrodes connected to the plurality of gate lines, a plurality of counter electrodes disposed to form a matrix and configured to form electrostatic capacitance between the plurality of pixel electrodes and the counter electrodes, and a plurality of touch sensor wires connected respectively to the plurality of counter electrodes, the touch panel display device further including a control unit configured to alternately switch between a gate scan period of sequentially switching the gate lines into a selected state in accordance with a predetermined indicated frequency in one frame period, and a sensor scan period of scanning each of segments by supplying a touch detection drive signal to the counter electrodes aligned along each of the gate lines by the segment and detecting electrostatic capacitance of the counter electrodes in each of the segments, in which the one frame period includes a plurality of gate scan periods each corresponding to the gate scan period and a plurality of sensor scan periods each corresponding to the sensor scan period, and the control circuit scans each of the segments in a first scan mode of completing touch detection of scanning all the segments in the one frame period a number of times other than an integer.

This configuration enables an in-cell touch panel display device to execute touch detection a number of times other than an integer, in one frame period.

DESCRIPTION OF EMBODIMENT

A touch panel display device according to a first configuration has an active matrix substrate, the active matrix substrate including a plurality of gate lines, a plurality of pixel electrodes connected to the plurality of gate lines, a plurality of counter electrodes disposed to form a matrix and configured to form electrostatic capacitance between the plurality of pixel electrodes and the counter electrodes, and a plurality of touch sensor wires connected respectively to the plurality of counter electrodes, the touch panel display device further includes a control circuit configured to alternately switch between a gate scan period of sequentially switching the gate lines into a selected state in accordance with a predetermined indicated frequency in one frame period, and a sensor scan period of scanning each of segments by supplying a touch detection drive signal to the counter electrodes aligned along each of the gate lines by the segment and detecting electrostatic capacitance of the counter electrodes in each of the segments, in which the one frame period includes a plurality of gate scan periods each corresponding to the gate scan period and a plurality of sensor scan periods each corresponding to the sensor scan period, and the control circuit scans each of the segments in a first scan mode of completing touch detection of scanning all the segments in the one frame period a number of times other than an integer.

The touch panel display device according to the first configuration includes the active matrix substrate and the control circuit. The active matrix substrate is provided with the plurality of gate lines, the pixel electrodes connected to the gate lines, the plurality of counter electrodes disposed to form the matrix and configured to form the electrostatic capacitance between the pixel electrodes and the counter electrodes, and the plurality of touch sensor wires connected respectively to the counter electrodes. The control circuit alternately switches between the gate scan period and the sensor scan period in the one frame period. The one frame period includes the plurality of gate scan periods and the plurality of sensor scan periods. In each of the gate scan periods, the gate lines are sequentially switched into the selected state in accordance with the indicated frequency during the one frame period. In each of the sensor scan periods, the touch detection drive signal is supplied, by the segment, to each of the counter electrodes aligned along each of the gate lines via the touch sensor wires, and each of the segments is scanned for detection of the electrostatic capacitance of the counter electrodes. The control circuit scans each of the segments in the first scan mode during each of the sensor scan periods. In the first scan mode, the touch detection of scanning all the segments completes a number of times other than an integer. The touch detection can thus be executed at scan speed different from speed for scan of the segments completed an integer number of times during the one frame period.

In the first configuration, the control circuit may scan each of the segments in one of the first scan mode and a second scan mode of completing the touch detection an integer number of times in the one frame period (a second configuration).

The second configuration enables scan in either the first scan mode or the second scan mode of completing the touch detection an integer number of times during the one frame period. The touch detection can thus be executed in a mode suitable for the type of a medium for execution of touch operation, for improvement in accuracy of touched position detection.

Optionally, in the first or second configuration, the first scan mode includes a plurality of scan patterns different from each other in numbers of the sensor scan periods necessary for execution of the touch detection once, the touch panel display device further includes a selection receiver configured to receive selection of one of the scan patterns, and the control circuit executes the touch detection in accordance with the one of the scan patterns received at the selection receiver (a third configuration).

The third configuration enables selection of one of the plurality of scan patterns. The scan patterns are different from each other in the number of the sensor scan periods necessary for execution of the touch detection once, and are thus different from each other in scan speed. This enables the touch detection to be executed in the scan pattern having scan speed suitable for the type of a medium for execution of touch operation or the like.

Optionally, in any one of the first to third configurations, the segments are overlapped respectively with the plurality of gate lines in a planar view, the control circuit further includes a storage configured to store correction information including a noise generating segment, out of the plurality of segments, having electrostatic capacitance detected in the one frame period and influenced by potential variation of a corresponding one of the gate lines in the one frame period, and a correction value for the electrostatic capacitance of the noise generating segment, and the control circuit corrects, out of the electrostatic capacitance detected during the sensor scan periods, the electrostatic capacitance of the noise generating segment included in the correction information in accordance with the correction value for the noise generating segment (a fourth configuration).

The fourth configuration enables correction of the electrostatic capacitance of the noise generating segment influenced by the potential variation of the gate lines during the one frame period, according to the correction value for the noise generating segment, out of the electrostatic capacitance of the segments detected during the sensor scan periods in the one frame period.

Optionally, in the fourth configuration, when executing the touch detection in the first scan mode, consecutive frame periods each have at least one noise generating segment corresponding to the noise generating segment, the plurality of scan patterns has the noise generating segments different from each other, the plurality of frame periods includes the noise generating segments having a pattern repeated at a cycle of the plurality of frame periods, the correction information includes the noise generating segment for each of the frame periods and the correction value for the noise generating segment in each of the scan patterns, and the control circuit corrects the electrostatic capacitance of the noise generating segment detected during the sensor scan periods in each of the frame periods in accordance with the correction value for the frame period (a fifth configuration).

According to the fifth configuration, in the case where the touch detection is executed in the first scan mode, the scan patterns each have the noise generating segments different from each other in the plurality of the frames, and the noise generating segments have the pattern repeated at the cycle of the plurality of frames. This configuration enables storing, as the correction information for each of the scan patterns, the noise generating segment included in each of the frames and the corresponding correction value for each of the frames. Out of the electrostatic capacitance of the segments detected in each of the frames, the electrostatic capacitance of the noise generating segment according to the scan pattern can thus be corrected in accordance with the correction value for the noise generating segment.

In the fifth configuration, at least one of the frame periods may include a plurality of noise generating segments each corresponding to the noise generating segment and different from each other (a sixth configuration).

The sixth configuration enables correction of the electrostatic capacitance detected in each of the noise generating segments in accordance with the correction value for the noise generating segment even in the case where there is the plurality of noise generating segments in one of the plurality of frame periods.

Embodiment

A touch panel display device according to an exemplary embodiment will be described in detail below with reference to the drawings. Identical or corresponding portions in the drawings will be denoted by identical reference signs and will not be described repeatedly. For clearer description, the drawings to be referred to hereinafter may depict simplified or schematic configurations or may not include some of constituent elements. The constituent elements in each of the drawings may not necessarily be depicted in actual dimensional ratios.

Figure 1:
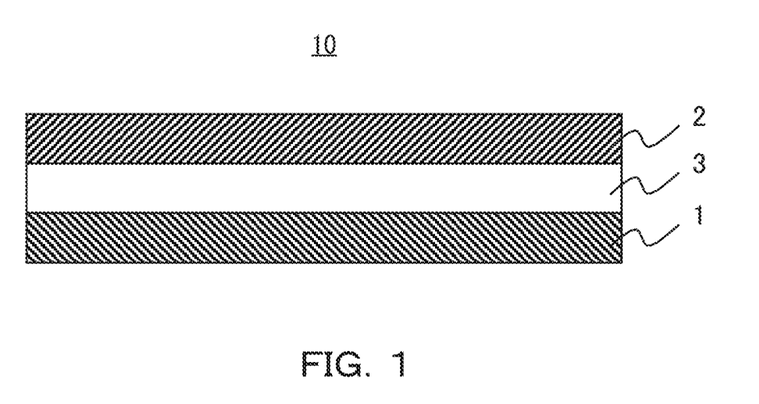
FIG. 1 is a sectional view depicting a schematic configuration of a touch panel display device according to an embodiment.

FIG. 1 is a sectional view of a touch panel display device according to an embodiment. A touch panel display device 10 includes an active matrix substrate 1, a counter substrate 2, and a liquid crystal layer 3 interposed between the active matrix substrate 1 and the counter substrate 2. The active matrix substrate 1 and the counter substrate 2 each include a substantially transparent glass substrate (having high translucency). The counter substrate 2 includes a color filter (not depicted). Though not depicted, the touch panel display device 10 further includes a pair of polarizing plates interposing the active matrix substrate 1 and the counter substrate 2, and a backlight unit provided in a side where a surface of the active matrix substrate not facing the liquid crystal layer 3 is located.

The touch panel display device 10 according to the present embodiment has a function of displaying an image as well as a function of detecting positional information (touched position) on input by a user in accordance with the displayed image. The touch panel display device 10 includes a so-called in-cell touch panel having electrodes, wiring, and the like that are necessary for touched position detection and are provided inside a display panel.

The touch panel display device 10 adopts a horizontal electric field drive system as a drive system for liquid crystal molecules included in the liquid crystal layer 3. In order to achieve the horizontal electric field drive system, the active matrix substrate 1 is provided with pixel electrodes and counter electrodes (also called common electrodes) for formation of an electric field.

Figure 2:
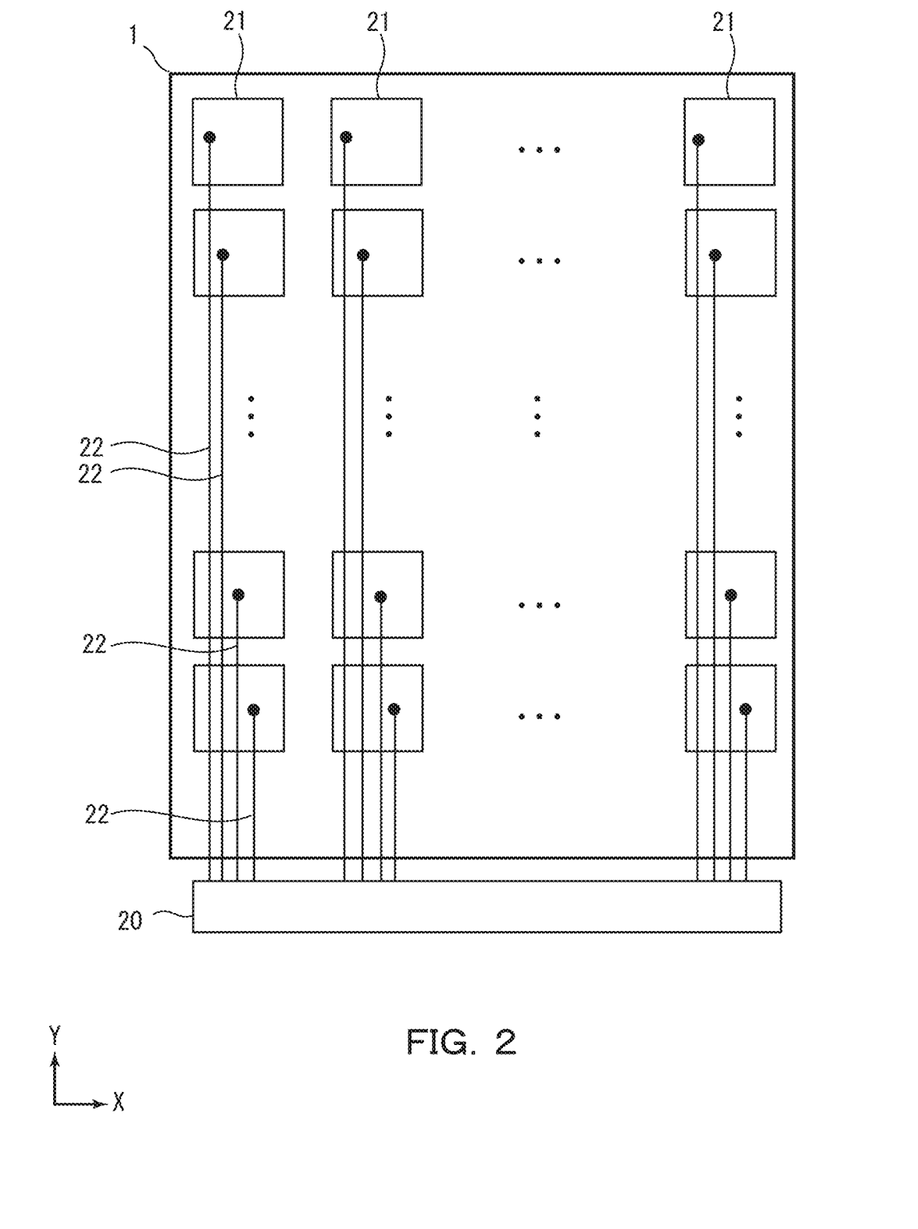
FIG. 2 is a pattern plan view of exemplary wiring for counter electrodes provided on an active matrix substrate.

FIG. 2 is a view depicting exemplary disposition of counter electrodes 21 provided on the active matrix substrate 1. The counter electrodes 21 are provided at the active matrix substrate 1 on a surface facing the liquid crystal layer 3. As depicted in FIG. 2, the active matrix substrate 1 is provided thereon with a plurality of counter electrodes 21 each having a rectangular shape and arrayed to form a matrix.

The active matrix substrate 1 is provided with a controller (control circuit) 20. The controller 20 includes a computer processing unit (CPU) and a memory (including a read only memory (ROM) and a random access memory (RAM)), and is configured to control for image display and control for touched position detection.

The controller 20 and each of the counter electrodes 21 are connected via a touch sensor wire 22 extending along a Y-axis. The active matrix substrate 1 is accordingly provided thereon with the touch sensor wires 22 of the number equal to the number of the counter electrodes 21.

In the touch panel display device 10 according to the present embodiment, the counter electrodes 21 paired with the pixel electrodes form electrostatic capacitance for control of image display as well as control of touched position detection.

The counter electrodes 21 adjacent to each other form parasitic capacitance. When a person touches a display screen of the display device 10 with a finger or the like, capacitance is formed between the finger and the display screen to increase the electrostatic capacitance. Upon control of touched position detection, the controller 20 supplies each of the counter electrodes 21 with a sensor drive signal via the corresponding touch sensor wire 22, and receives a touch detection signal via the touch sensor wire 22. This enables detection of change in electrostatic capacitance, and touched position is detected based on the detection of change in electrostatic capacitance. The touch sensor wires 22 function as wires for transmission and reception of the sensor drive signal and the touch detection signal.

Figure 3:
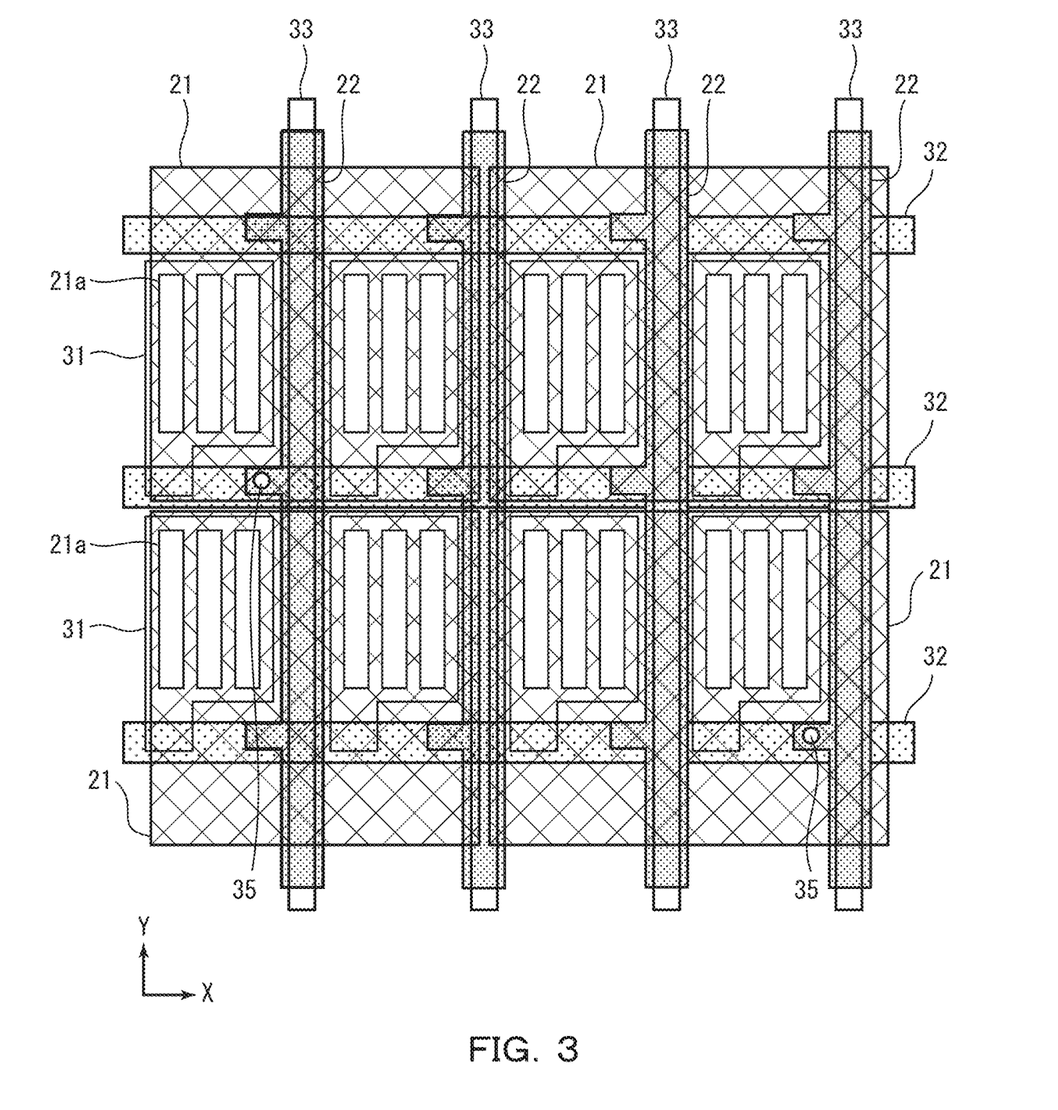
FIG. 3 is an enlarged view of a partial region of the active matrix substrate.

FIG. 3 is an enlarged view of a partial region of the active matrix substrate 1. As depicted in FIG. 3, there is provided a plurality of pixel electrodes 31 arrayed to form a matrix. Though not depicted in FIG. 3, there are provided thin film transistors (TFTs) each functioning as a display control element and arrayed to form a matrix correspondingly to the pixel electrodes 31. The counter electrodes 21 are each provided with a plurality of slits 21a.

The pixel electrodes 31 are surrounded with gate lines 32 and source lines 33. There is provided a plurality of gate lines 32 extending along an X-axis and disposed at predetermined intervals along the Y-axis. There is provided a plurality of source lines 33 extending along the Y-axis and disposed at predetermined intervals along the X-axis. The gate lines 32 and the source lines 33 form a lattice, and the pixel electrodes 31 are disposed respectively in regions partitioned by the gate lines 32 and the source lines 33. The gate lines 32 and the source lines 33 are connected to the controller 20 (see FIG. 2).

The number of the touch sensor wires 22 is equal to the number of the counter electrodes 21, and the touch sensor wires 22 each connect a corresponding one of the counter electrodes 21 to the controller 20. As depicted in FIG. 3, the touch sensor wires 22 extending along the Y-axis are disposed to be partially overlapped with the source lines 33 extending along the Y-axis in a normal direction of the active matrix substrate 1. Specifically, the touch sensor wires 22 are provided above the source lines 33 and are partially overlapped with the source lines 33 in a planar view.

FIG. 3 includes white circles 35 each indicating a position where the counter electrode 21 and the touch sensor wire 22 are connected to each other.

Figure 4:
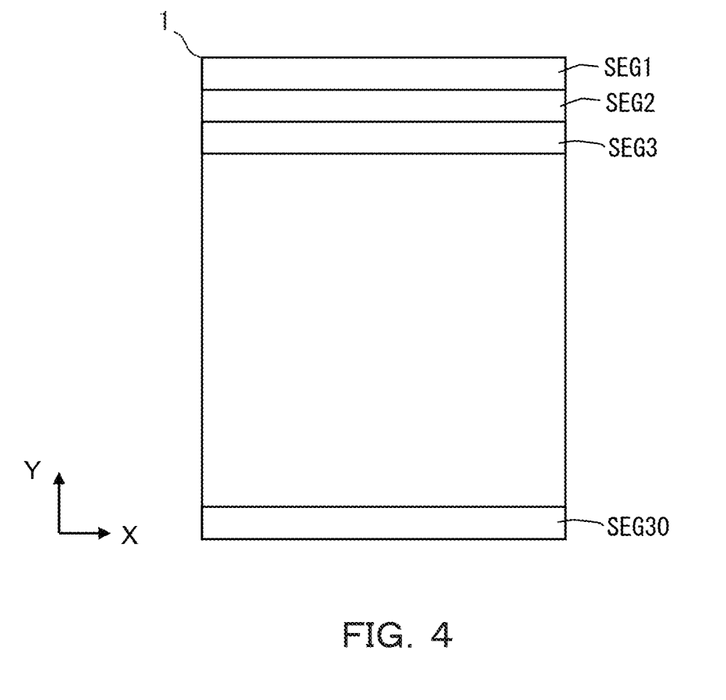
FIG. 4 is a pattern plan view depicting division of the counter electrodes into segments.
Figure 5:
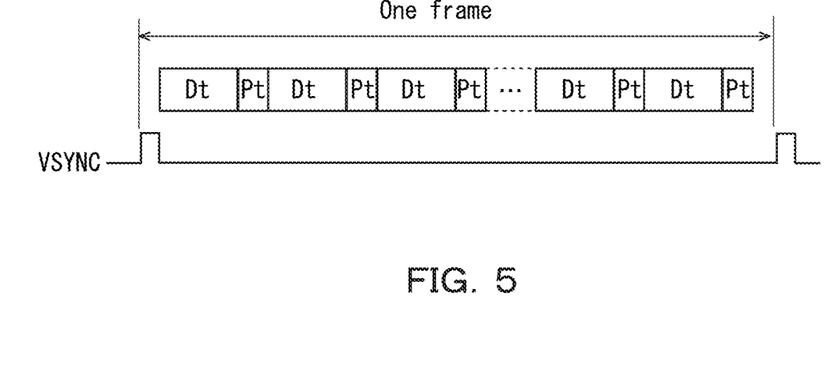
FIG. 5 is a pattern chart indicating gate scan periods and sensor scan periods in one frame.

Described next with reference to FIGS. 4 and 5 is a method of driving the touch panel display device 10 according to the present embodiment. The following description assumes that the number of the gate lines 32 provided on the touch panel display device 10 is 1920, and these 1920 gate lines 32 will be denoted by reference signs GL1 to GL1920.

This example assumes that the counter electrodes 21 each function as a touch sensor and form 30 rows aligned along the Y-axis, and the counter electrodes 21 are divided into 30 segments (SEG1 to SEG30) along the Y-axis as depicted in FIG. 4. Each of the segments accordingly includes the counter electrodes 21 aligned in one row along each of the gate lines 32.

The numbers of the gate lines 32 and the counter electrodes 21 are merely exemplified herein, and the present invention is not limited to these numbers. The numbers of the gate lines 32 and the counter electrodes 21 are set appropriately.

The touch panel display device 10 executes a counter-electrode scan motion of driving the counter electrodes 21 by the segment, and ends execution of a touch detection motion once when completing the counter-electrode scan motion for all the segments. Specifically, the touch panel display device 10 executes the counter-electrode scan motion once, including supplying, via a corresponding one of the touch sensor wires 22, the sensor drive signal (a touch detection drive signal) to each of the counter electrodes 21 included in part of the segments SEG1 to SEG30 and reading, via the touch sensor wires 22, a sensor signal indicating electrostatic capacitance of the counter electrode 21. Execution of the touch detection motion once ends upon completion of the counter-electrode scan motion for all the 30 segments.

FIG. 5 is a timing chart indicating each timing of a gate scan motion of driving the gate lines 32 and the counter-electrode scan motion in one frame. FIG. 5 includes periods denoted by reference sign "Dt" and corresponding to gate scan periods for execution of the gate scan motion. The gate scan periods can each be called an image display control period for execution of image display by driving the gate lines 32. FIG. 5 also includes periods denoted by reference sign "Pt" and corresponding to sensor scan periods for execution of the counter-electrode scan motion. The sensor scan periods can each be called a touched position detection control period for execution of touched position detection through supply of the sensor drive signal to each of the touch sensor wires 22.

The controller 20 starts the gate scan motion in synchronization with a vertical synchronizing signal (VSYNC) indicated in FIG. 5. Specifically, the controller 20 supplies, during each of the gate scan periods Dt, a selection signal to the gate line 32 to be driven in each horizontal scan period or the like and supplies a non-selection signal to each of the remaining gate lines 32, in synchronization with a clock signal. When the selection signal is supplied to the gate line 32, the TFTs (display control elements) connected to the gate line 32 are turned ON and gradation voltage of an image to be displayed at pixels provided with the pixel electrodes 31 connected to the TFTs is applied from the source lines 33 to the pixel electrodes 31.

The controller 20 executes the gate scan motion during the gate scan periods Dt and halts the gate scan motion during the sensor scan periods Pt.

During each of the sensor scan periods Pt, the controller 20 supplies each of the counter electrodes 21 with the sensor drive signal via the corresponding touch sensor wire 22 by the segment (see FIG. 4) and receives the sensor signal via the touch sensor wire 22. The controller 20 can thus detect change in electrostatic capacitance of each of the counter electrodes 21 in the segment provided with the sensor drive signal to achieve touched position detection.

The controller 20 executes the counter-electrode scan motion during the sensor scan periods Pt and halts the counter-electrode scan motion during the gate scan periods Dt.

In this manner, the controller 20 alternately executes the gate scan motion and the counter-electrode scan motion during one frame period. The gate scan periods Dt each have a length set to cause all the gate lines 32 to be scanned once during all the gate scan periods Dt in one frame period, and the sensor scan periods Pt each have a length set in accordance with the length of the gate scan periods Dt. The number of segments to be execution targets of the counter-electrode scan motion during one of the sensor scan period Pt varies in accordance with the length of the sensor scan periods Pt.

As described above, conventionally, scan speed of the counter electrodes 21 has been typically set to complete the touch detection motion an integer number of times in one frame period. That is, the touch detection motion has been executed in synchronization with an indicated frequency. The present embodiment provides a scan mode (first scan mode) of executing the touch detection motion in asynchronization with the indicated frequency to achieve the touch detection motion a number of times other than an integer during one frame period, as well as a scan mode (second scan mode) of executing the touch detection motion in synchronization with the indicated frequency.

In the following description, the scan mode of completing the touch detection motion an integer number of times in one frame period will be referred to as a scan mode A, whereas the scan mode of executing the touch detection motion a number of times other than an integer in one frame period will be referred to as a scan mode B.

The scan modes according to the present embodiment will be described specifically and exemplarily. This example assumes that the indicated frequency in one frame has 60 Hz, and one frame period includes ten sensor scan periods Pt.

Figure 6:
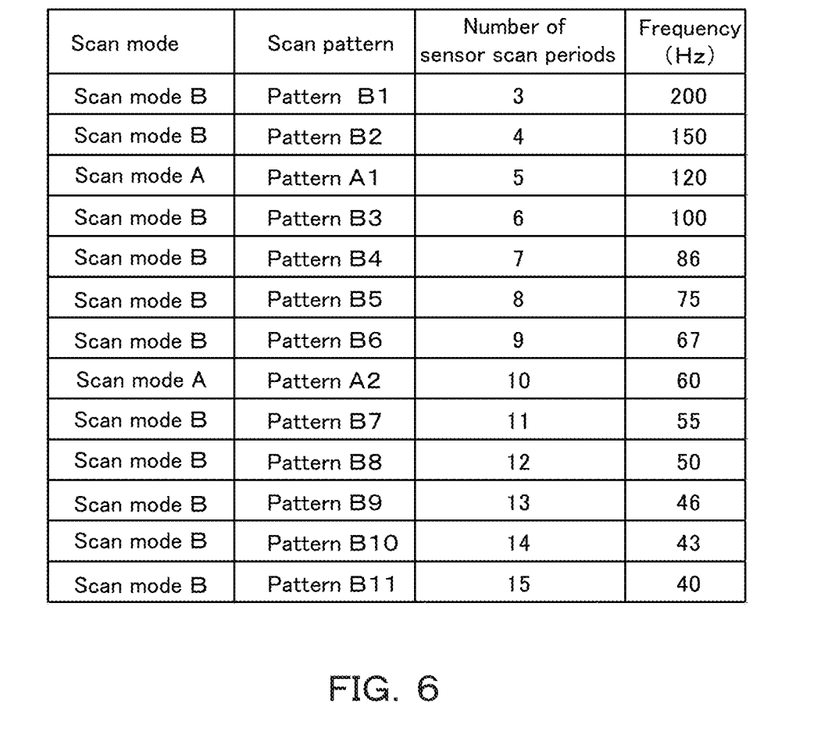
FIG. 6 is a chart exemplifying scan mode information according to the embodiment.

FIG. 6 is a chart exemplifying the scan modes according to the present embodiment. FIG. 6 indicates sensor scan mode information stored in the memory of the controller 20.

FIG. 6 includes a column "scan mode" indicating the scan mode A or the scan mode B. FIG. 6 further includes a column "number of sensor scan periods" indicating the number of the sensor scan periods necessary for execution of the touch detection motion once, and a column "frequency" indicating a frequency of the touch detection motion. The scan mode information includes the numbers of the sensor scan periods necessary for execution of the touch detection motion once, in other words, a plurality of scan patterns varied in scan speed.

The number of the sensor scan periods necessary for execution of the touch detection motion once can be set from 3 to 15 in this example. In an exemplary case where the number of the sensor scan periods is "3" in the scan mode B, execution of the touch detection motion once is completed in three sensor scan periods. One frame period includes ten sensor scan periods Pt, so that execution of the touch detection motion three times completes during the first to ninth sensor scan periods Pt and the counter-electrode scan motion of the fourth touch detection motion starts in the tenth sensor scan period Pt. In this case, the touch detection motion is executed a number of times other than an integer in one frame period because the fourth touch detection motion is executed in the current and subsequent frames. In another case where the number of the sensor scan periods is "5" or "10" in the scan mode A, the touch detection motion completes during one frame period and is executed an integer number of times during the one frame period.

FIG. 6 merely exemplifies the numbers of the sensor scan periods necessary for execution of the touch detection motion once, and the present invention is not limited to these exemplification. The number of the sensor scan periods may be set to be less than 3, or equal to or more than 16.

The controller 20 executes the touch detection motion in accordance with one of the scan patterns in the scan mode information indicated in FIG. 6, as commanded by an external circuit (not depicted).

(Correction of Touch Detection Result)

Due to voltage variation of the gate line 32 driven last in the gate scan period Dt immediately before the sensor scan period Pt, each of the counter electrodes 21 in the segment to be scanned at the start of the sensor scan period Pt outputs the sensor signal that is likely to include noise. Described below is why such noise is generated.

The controller 20 supplies all the counter electrodes 21 with a constant voltage signal for image display during the gate scan periods Dt. During each of the sensor scan periods Pt, the controller 20 supplies, via the touch sensor wires 22, the counter electrodes 21 in the segment to be driven, with a voltage signal having potential alternately reaching a high (H) level and a low (low) level periodically, as the sensor drive signal for touch detection.

Figure 7A:
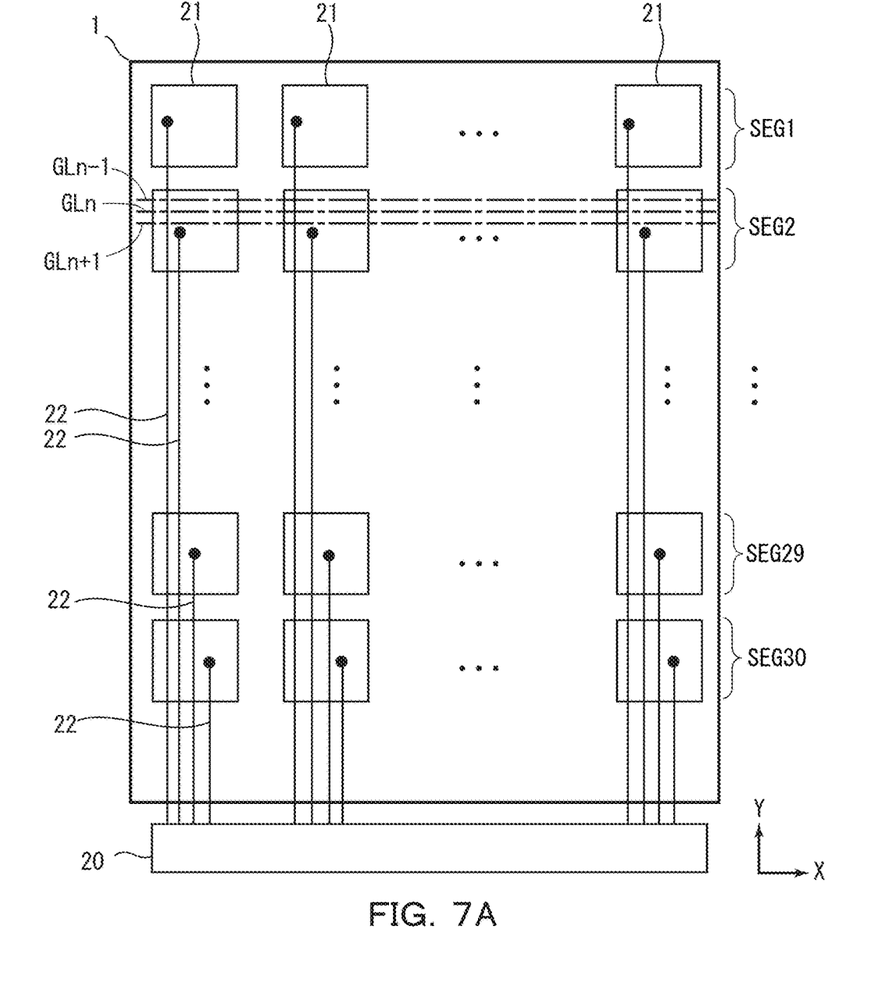
FIG. 7A is an explanatory pattern view of a noise generating segment.

Assume that a gate line GLn is driven last during the gate scan period Dt immediately before one of the sensor scan periods Pt and the counter electrodes 21 in the segment SEG2 overlapped with the gate line GLn in a planar view are driven initially during the sensor scan period Pt, as depicted in FIG. 7A. The sensor signal transmitted from each of the counter electrodes 21 in the segment SEG2 is likely to be influenced by voltage variation of the gate line GLn in this case.

Figure 7B:
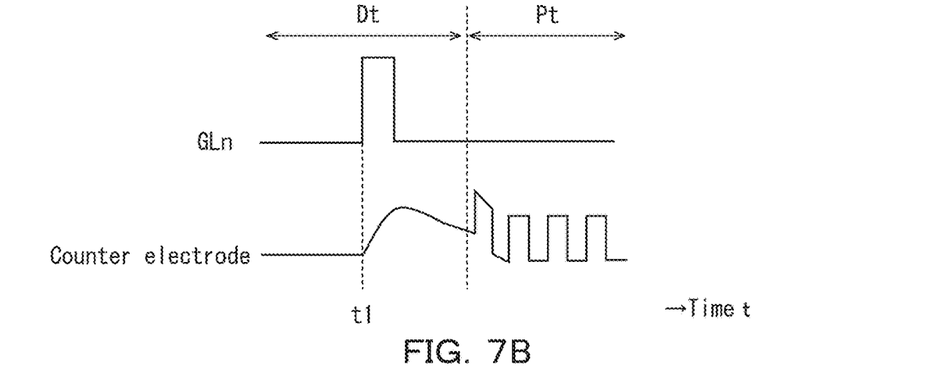
FIG. 7B is a chart indicating potential change of a gate line and the noise generating segment.

As indicated in FIG. 7B, potential of the counter electrodes 21 in the segment SEG2 is increased due to potential variation of the gate line GLn when the gate line GLn has potential of the selection signal at time t1 in the gate scan period Dt. If the sensor scan period Pt starts and the counter electrodes 21 in the segment SEG2 are each supplied with the sensor drive signal before the increased potential of the counter electrodes 21 returns to an original level, the potential of the counter electrodes 21 at the start of the sensor scan period Pt is higher than original potential of the drive signal to have a voltage waveform distortion. Accordingly, noise due to such a voltage waveform distortion of each of the counter electrodes 21 in the segment SEG2 is superimposed on the sensor signal outputted from the counter electrode 21 via the corresponding touch sensor wire 22.

As described above, the present embodiment enables selection of one of the plurality of scan patterns. The frame and the segment having noise generation are changed in position depending on the selected scan pattern.

Figure 8:
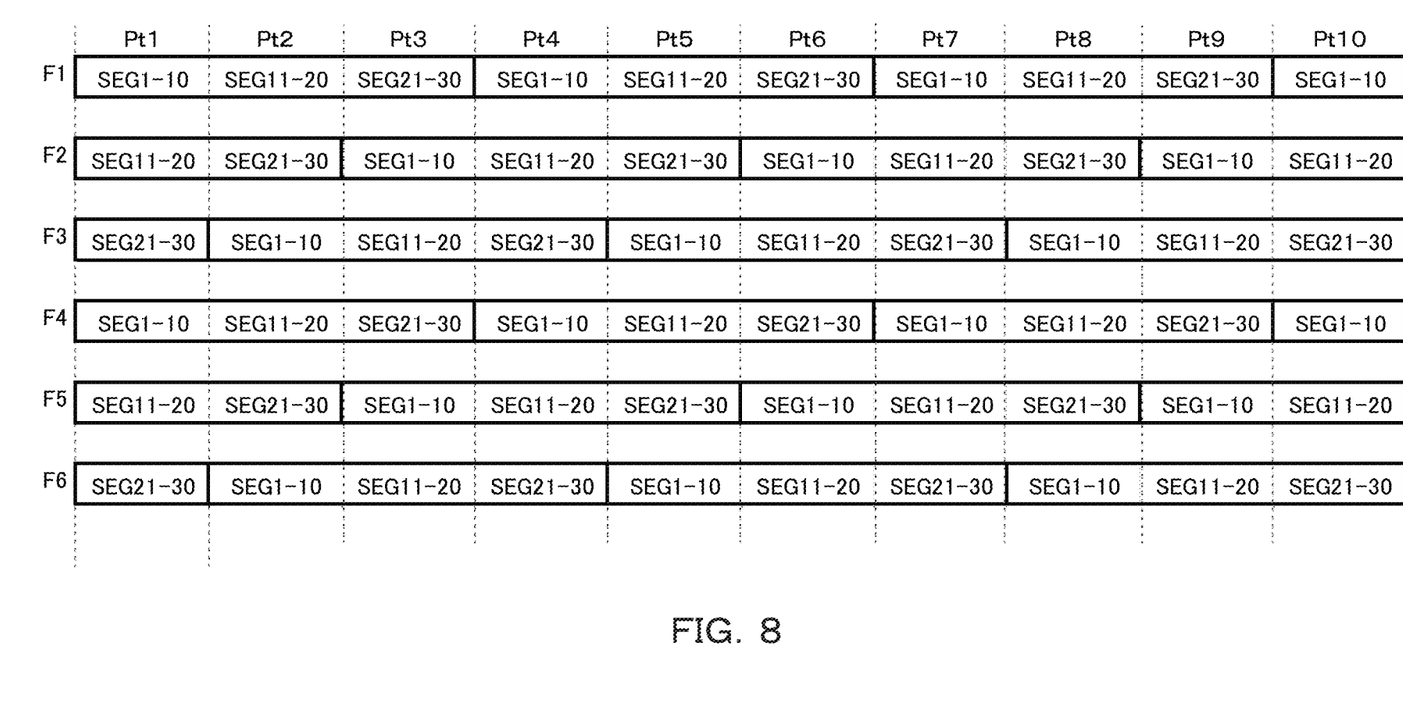
FIG. 8 is an explanatory chart of segments driven in the sensor scan period in each frame in a case where the number of the sensor scan periods necessary for execution of a touch detection motion once is three.

One scan pattern may have noise generation in the segment at a different position in each frame. In an exemplary case where the number of the sensor scan periods is 3 in FIG. 6, 30 segments are to be sequentially driven by the ten segments from the segment SEG1 during the first to tenth sensor scan periods Pt in one frame period. FIG. 8 is a chart of segments scanned during each of first to tenth sensor scan periods Pt1 to Pt10 in each of frames (F1 to F6) in this case.

As indicated in FIG. 8, in the first frame (F1), the segments SEG1 to SEG10, SEG11 to SEG20, and SEG21 to SEG30 are scanned during the sensor scan periods Pt1, Pt2, and Pt3, respectively. The segments are scanned during the subsequent fourth to tenth sensor scan periods Pt4 to Pt10 similarly to the sensor scan periods Pt1 to Pt3. Accordingly, the segments SEG1 to SEG30 are each scanned three times during the sensor scan periods Pt1 to Pt9 in the first frame to achieve execution of the touch detection motion three times. In the tenth sensor scan period Pt10, the segments SEG1 to SEG10 are scanned again as the counter-electrode scan motion of the fourth touch detection motion.

Subsequently during the sensor scan period Pt1 in the second frame (F2), the segments SEG11 to SEG20 are scanned, which are positioned behind, by ten segments, the segments scanned during the sensor scan period Pt1 in the first frame. Similarly, scanned during each of the sensor scan periods Pt2 to Pt10 are the segments positioned behind, by ten segments, the segments scanned during the same sensor scan period Pt in the first frame. The fourth touch detection motion to the sixth touch detection motion are accordingly executed during the tenth sensor scan period Pt10 in the first frame and the first to eighth sensor scan periods Pt in the second frame.

During the sensor scan periods Pt9 and Pt10 in the second frame (F2), the segments SEG1 to SEG20 are scanned again by the ten segments as the counter-electrode scan motion of the seventh touch detection motion. Scanned during each of the sensor scan periods Pt in the subsequent third frame (F3) are accordingly the segments positioned behind, by twenty segments, the segments scanned during the same sensor scan period Pt in the second frame. The seventh touch detection motion to the tenth touch detection motion are thus executed during the sensor scan periods Pt9 and Pt10 in the second frame and during the sensor scan periods Pt1 to Pt10 in the third frame so as to be completed at the end of the third frame.

The segments scanned during each of the sensor scan periods Pt in the fourth to sixth frames (F4 to F6) are the same as the segments scanned during each of the sensor scan periods Pt in the first to third frames (F1 to F3).

In the case where one frame period includes ten sensor scan periods Pt and the number of the sensor scan periods Pt necessary for execution of the touch detection motion once is three, execution of the touch detection motion ten times completes during consecutive three frame periods. The segments scanned during the sensor scan periods Pt in each of the frames have a same pattern in every three frames. Execution of the touch detection motion ten times in a series is repeated at the cycle of three frames. Hereinafter, assume that the series of touch detection motions are executed at a series motion cycle.

The above example provides the case where the number of the sensor scan periods Pt necessary for execution of the touch detection motion once is 3. The example is applicable also to a case where the number of the sensor scan periods Pt necessary for execution of the touch detection motion once is from 4 to 15. In other words, the series motion cycle has the frame periods of the number obtained by dividing the least common multiple between the number "10" of the sensor scan periods Pt in one frame period and a number "N" of the sensor scan periods Pt necessary for execution of the touch detection motion once, by the number "10" of the sensor scan periods Pt in the one frame period.

In the case where the number of the sensor scan periods Pt necessary for execution of the touch detection motion once is "3", the segments scanned during the same sensor scan period are different among the three frames corresponding to the series motion cycle, as indicated in FIG. 8. The 1920 gate lines GL1 to GL1920 are driven at substantially identical timing in each frame. Accordingly, the segments having noise due to voltage variation of the gate lines 32 are different among the three frames. The series motion cycle has one frame period in the case where the number of the sensor scan periods Pt necessary for execution of the touch detection motion once is "5" or "10", and the series of touch detection motions complete during the one frame period. The same segments are driven in the same sensor scan period Pt in each of the frames in this case, and the segments influenced by voltage variation of the gate lines 32 have common positions in each of the frames.

The noise generating segments are varied in position in accordance with the scan patterns. The memory of the controller 20 may thus preliminarily store correction information for each scan pattern, including a position of the segment (positions of the counter electrodes 21) in the frame having noise generation and a correction value for the noise being associated with each other for each of the scan patterns.

Figure 9:
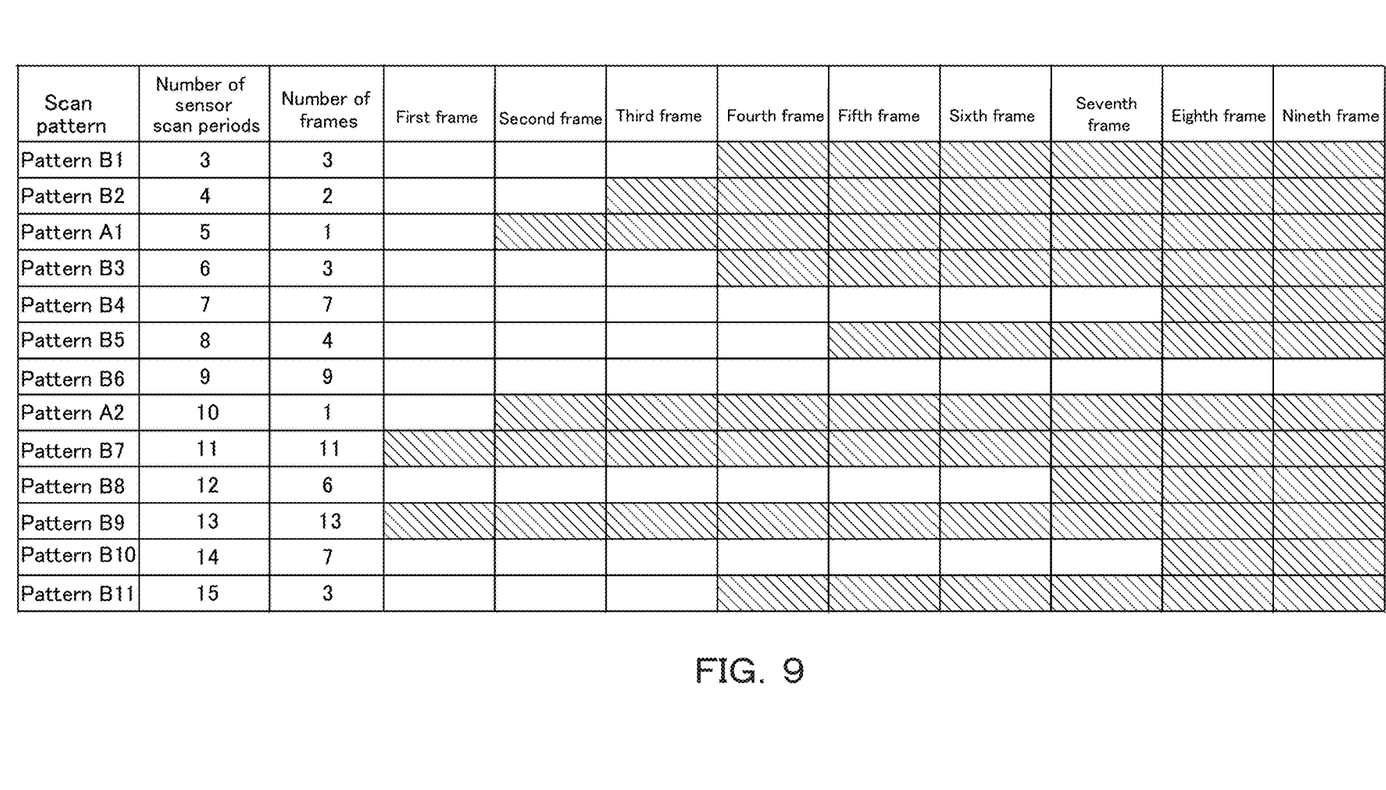
FIG. 9 is a chart exemplifying correction information for each scan pattern stored in a controller.

FIG. 9 is a chart exemplifying the correction information for each scan pattern according to the present embodiment. FIG. 9 includes a column "number of frames" indicating the number of frames corresponding to the series motion cycle according to each of the scan patterns. FIG. 9 further includes columns "first frame" to "ninth frame" each provided with "correction information (segment information and correction value)" indicating information on and a correction value for the segment (counter electrodes 21) having noise generation (hereinafter, referred to as a noise generating segment) in each of the number of frames as the corresponding series motion cycle.

FIG. 9 does not include specific correction information that is assumed to be indicated in each of unhatched fields in the columns "first frame" to "ninth frame". In a case where each frame has one noise generating segment in each of the scan patterns, the correction information includes the noise generating segment and the correction value for the segment. In another case where one frame has a plurality of noise generating segments, the correction information includes the plurality of segments and correction values for the respective segments associated with each other.

Stored in this example is the correction information in each of the frames in a case where the series motion cycle has at most nine frames, excluding correction information for the tenth and subsequent frames. The noise generating segment will thus not be corrected in each of scan patterns B7 and B11 with the series motion cycle having ten or more frame periods. The correction information for each scan pattern may thus exclude information on these scan patterns. If the memory of the controller 20 has enough capacity, the correction information on each of the frames may be similarly stored also in such a case where the series motion cycle has ten or more frame periods.

The controller 20 refers to correction information on each frame according to the scan pattern in the correction information for each scan pattern, and corrects, in accordance with the correction value for the noise generating segment, electrostatic capacitance of the segment indicated by the correction information, among electrostatic capacitance according to the sensor signals outputted from the segments in the frames.

Described below is an exemplary method of setting the correction value. For example, the counter-electrode scan motion is preliminarily executed for each of the scan patterns without executing the gate scan motion in a state where a display surface is untouched. Electrostatic capacitance detected in each segment includes no noise due to voltage variation of the gate line 32 in this case. The electrostatic capacitance in each of the segments is thus assumed to have a default value. In the state where the display surface is untouched, the gate scan motion and the counter-electrode scan motion are preliminarily executed alternately during frame periods equal to or more than the series motion cycle in each of the scan patterns to detect electrostatic capacitance in each of the segments in each of the frames. The electrostatic capacitance detected in the respective segments includes electrostatic capacitance having noise due to voltage variation of the gate line 32. This example assumes that a noise generating segment has a difference between the default value for each segment and the electrostatic capacitance in each of the segments in each of the frames corresponding to the series motion cycle, and the difference is equal to or more than a predetermined threshold. The difference between a sensor value (electrostatic capacitance) of the noise generating segment and the default value is set as the correction value for the noise generating segment.

The embodiment described above includes selecting a scan pattern in either one of the scan mode A having scan speed set such that the touch detection motion is executed an integer number of times in one frame period, and the scan pattern B having scan speed set such that the touch detection motion is executed a number of times other than an integer in one frame period, and executing the counter-electrode scan motion in accordance with the scan pattern thus selected. The touch detection motion can thus be executed in the scan pattern having scan speed suitable for the type of a medium for execution of touch operation, to achieve improvement in accuracy of touched position detection.

The controller 20 according to the above embodiment preliminarily stores a noise generating segment and a correction value therefor in each frame according to the scan pattern. Even in a case where any one of the scan patterns is selected, the sensor value (electrostatic capacitance) of the noise generating segment in each frame can thus be corrected with reference to the correction value for the corresponding frame according to the scan pattern.

Modification Examples

The embodiment described above is merely exemplified herein. The touch panel display device should not be limited to the above embodiment, but can be implemented with appropriate modifications to the above embodiment without departing from the spirit of the present invention.

(1) The above embodiment exemplifies the case where the correction value for each of the counter electrodes 21 in the noise generating segment is obtained as the difference between the electrostatic capacitance of the corresponding counter electrode 21 in the noise generating segment and the default value of the electrostatic capacitance of the counter electrode 21. The present invention should not be limited to this example in terms of the method of setting the correction value. For example, the correction value for all the counter electrodes 21 in the noise generating segment may be obtained as an average value of the differences between the electrostatic capacitance of the counter electrodes 21 in the noise generating segment and the default value.

The invention claimed is:

1. A touch panel display device having an active matrix substrate,
the active matrix substrate comprising:
a plurality of gate lines;
a plurality of pixel electrodes connected to the plurality of gate lines;
a plurality of counter electrodes disposed to form a matrix and configured to form electrostatic capacitance between the plurality of pixel electrodes and the counter electrodes; and
a plurality of touch sensor wires connected respectively to the plurality of counter electrodes,
the touch panel display device further comprising:
a control circuit configured to alternately switch between a gate scan period of sequentially switching the gate lines into a selected state in accordance with a predetermined indicated frequency in one frame period, and a sensor scan period of scanning each of segments by supplying a touch detection drive signal to the counter electrodes aligned along each of the gate lines by the segment and detecting electrostatic capacitance of the counter electrodes in each of the segments, wherein
the one frame period includes a plurality of gate scan periods each corresponding to the gate scan period and a plurality of sensor scan periods each corresponding to the sensor scan period,
the control circuit scans each of the segments in a first scan mode of completing touch detection of scanning all the segments in the one frame period a number of times other than an integer,
the segments are overlapped respectively with the plurality of gate lines in a planar view,
the control circuit further includes a storage configured to store correction information including a noise generating segment, out of the plurality of segments, having electrostatic capacitance detected in the one frame period and influenced by potential variation of a corresponding one of the gate lines in the one frame period, and a correction value for the electrostatic capacitance of the noise generating segment,
the control circuit corrects, out of the electrostatic capacitance detected during the sensor scan periods, the electrostatic capacitance of the noise generating segment included in the correction information in accordance with the correction value for the noise generating segment, when executing the touch detection in the first scan mode, consecutive frame periods each have at least one noise generating segment corresponding to the noise generating segment, the plurality of scan patterns has the noise generating segments different from each other, the plurality of frame periods includes the noise generating segments having a pattern repeated at a cycle of the plurality of frame periods, the correction information includes the noise generating segment for each of the frame periods and the correction value for the noise generating segment in each of the scan patterns, and the control circuit corrects the electrostatic capacitance of the noise generating segment detected during the sensor scan periods in each of the frame periods in accordance with the correction value for the frame period.

2. The touch panel display device according to claim 1, wherein the control circuit scans each of the segments in one of the first scan mode and a second scan mode of completing the touch detection an integer number of times in the one frame period.

3. The touch panel display device according to claim 1, wherein the first scan mode includes a plurality of scan patterns different from each other in numbers of the sensor scan periods necessary for execution of the touch detection once, the touch panel display device further comprises a selection receiver configured to receive selection of one of the scan patterns, and the control circuit executes the touch detection in accordance with the one of the scan patterns received at the selection receiver.

4. The touch panel display device according to claim 1, wherein at least one of the frame periods includes a plurality of noise generating segments each corresponding to the noise generating segment and different from each other.

* * * * *